L. J. CAMPBELL.
CLUTCH.
APPLICATION FILED APR. 27, 1912.
1,036,560.
Patented Aug. 27, 1912.
3 SHEETS—SHEET 2.
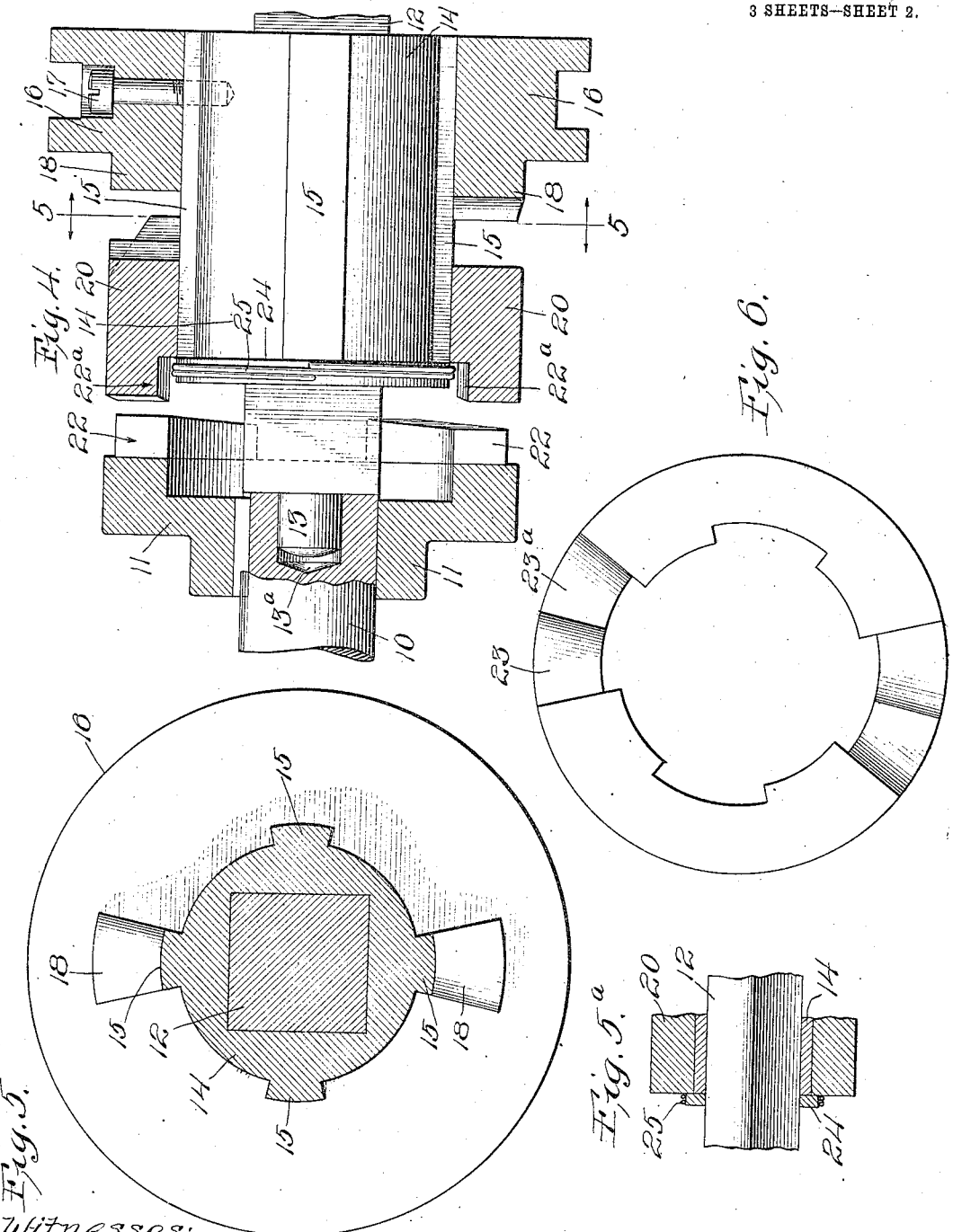
Witnesses:
Inventor:
Leon J. Campbell
by C. Clarence Poole
Atty.

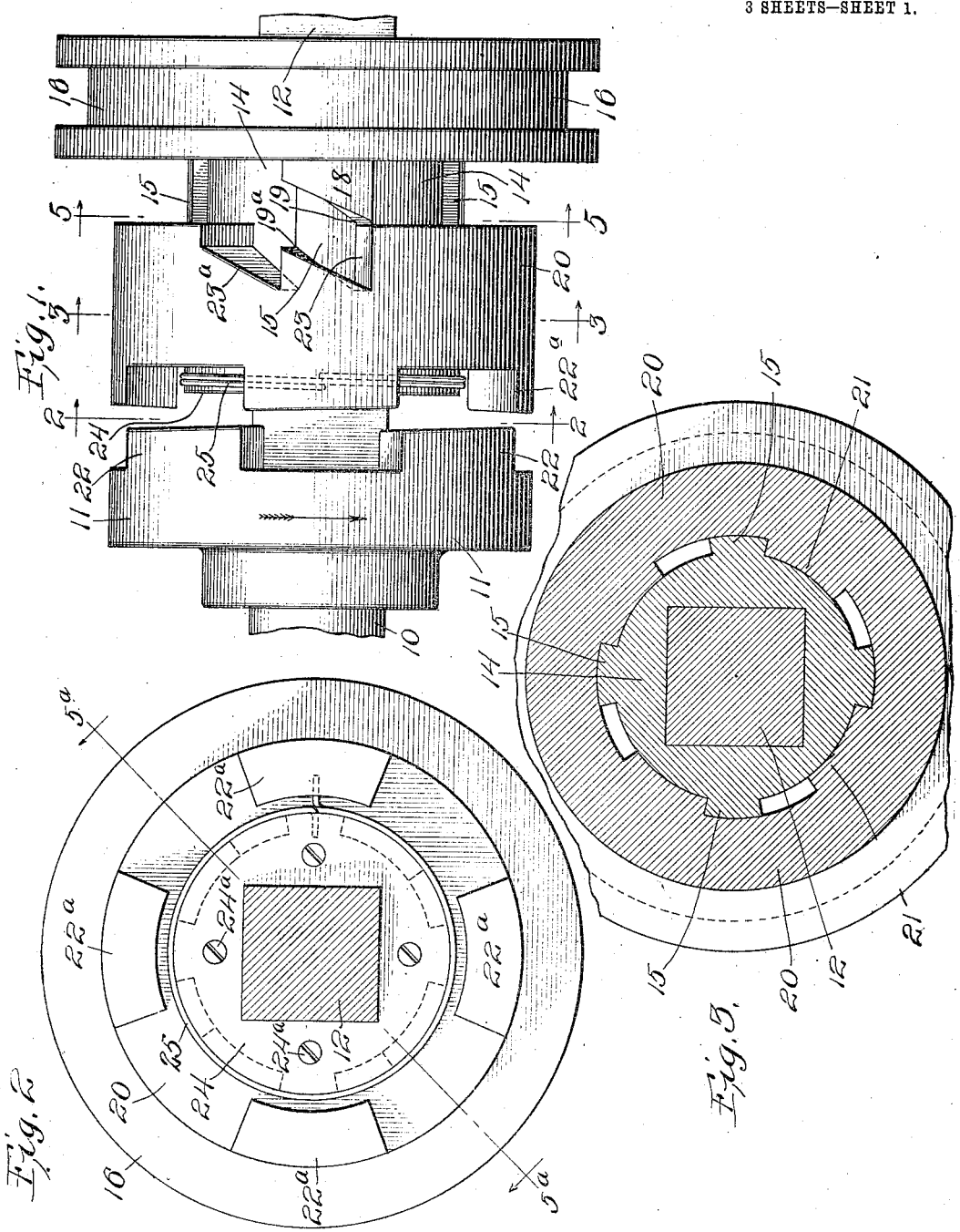

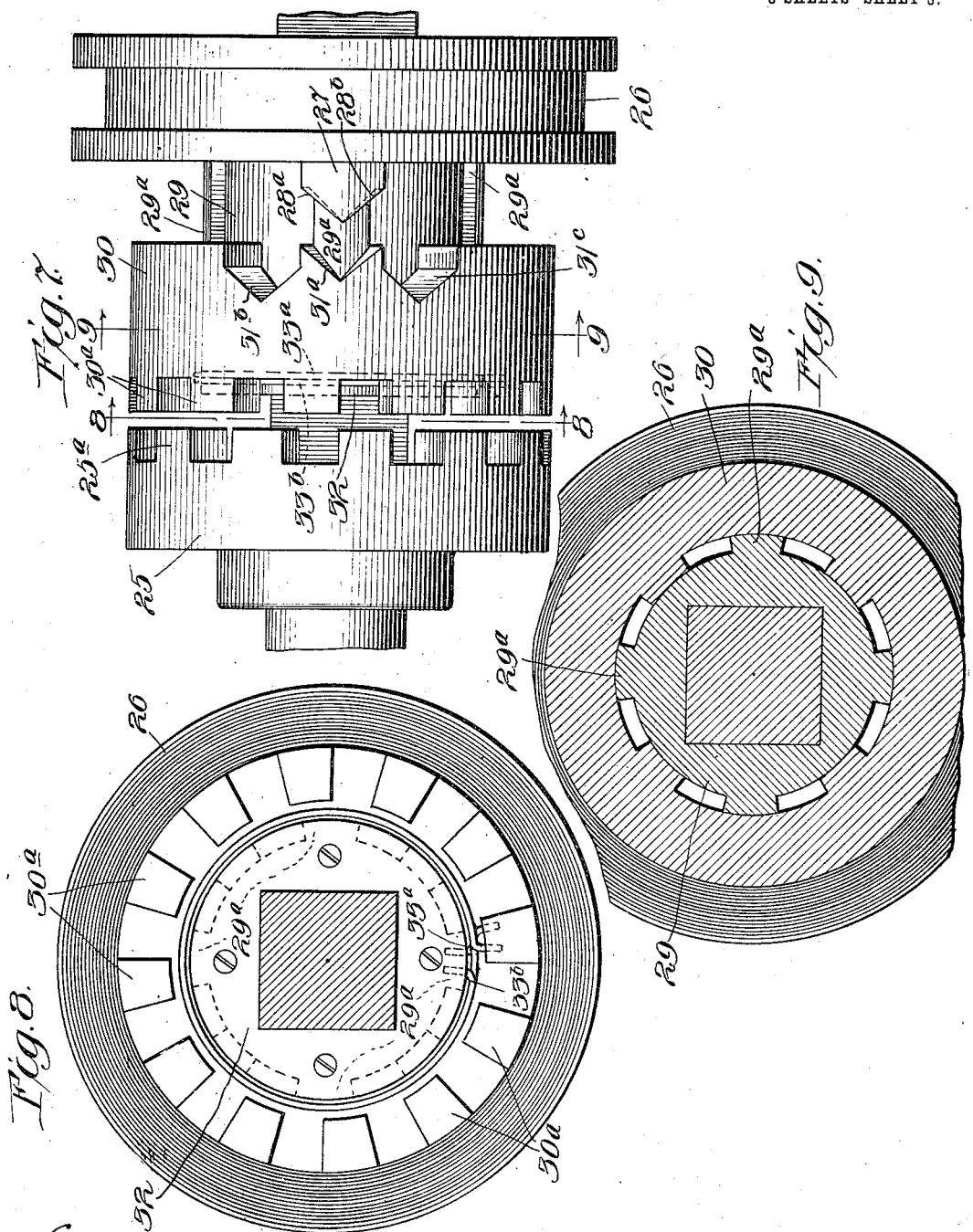

UNITED STATES PATENT OFFICE.

LEON J. CAMPBELL, OF CHICAGO, ILLINOIS, ASSIGNOR TO JAMES T. HEALY, TRUSTEE, OF CHICAGO, ILLINOIS.

CLUTCH.

1,036,560.  Specification of Letters Patent.  Patented Aug. 27, 1912.

Application filed April 27, 1912. Serial No. 693,551.

*To all whom it may concern:*

Be it known that I, LEON J. CAMPBELL, a citizen of the United States, and a resident of Chicago, in the county of Cook and State of Illinois, have invented certain new and useful Improvements in Clutches; and I do hereby declare that the following is a full, clear, and exact description thereof, reference being had to the accompanying drawings, and to the letters of reference marked thereon, which form a part of this specification.

This invention relates to improvements in positively acting clutches and particularly to a clutch which performs its function by the interlocking of the annularly arranged teeth of a driving member with the like teeth of a driven member.

The object of this invention is to provide a construction whereby the said driven member will be automatically thrown into positive engagement with said driving member at the instant of the initial contact between the teeth of said members.

The invention consists of the matters hereinafter described and more particularly pointed out in the appended claims.

In the drawings—Figure 1 is a view in side elevation of the clutch with the members thereof disengaged. Fig. 2 is a cross-section taken on line 2—2 of Fig. 1. Fig. 3 is a cross-section taken on line 3—3 of Fig. 1. Fig. 4 is a longitudinal section with parts in elevation of the clutch with its members disengaged. Fig. 5 is a cross-section taken to the right of line 4—4 of Fig. 4. Fig. 5ª is a cross-sectional view on a reduced scale, taken on the line 5ª—5ª of Fig. 2. Fig. 6 is a view in end elevation of the clutch ring. Fig. 7 is a view in side elevation, showing a modification of the clutch with the members thereof disengaged. Fig. 8 is a cross-section taken on line 8—8 of Fig. 7. Fig. 9 is a cross-section taken on line 9—9 of Fig. 7.

Referring to the drawings, Figs. 1 to 6, 10 indicates a driving shaft, which may be any power driven shaft, to which is rigidly attached the driving clutch member 11. Equally spaced circumferentially about the inner face of said member, are radial grooves or spaces between which are formed an equal number of teeth 22, 22, similarly spaced.

12 indicates a driven shaft, which is co-axial with the driving shaft 10, its alinement being maintained by the action of a cylindrical projection 13 at the extremity of the driven shaft, turning in a suitable bearing recess 13ª at the adjacent end of the driving shaft 10.

14 indicates a cylindrically-shaped clutch sleeve fitted upon the driven shaft 12, and having longitudinal movement on said shaft, but held from rotation thereon, by reason of the cross-sectional form of the shaft and the aperture of the sleeve. The shaft is shown as made square in cross-section, but it may be of any form suitable to prevent the rotation of said clutch sleeve upon it. In the outer cylindrical surface of said clutch sleeve are a series of longitudinal grooves, between which are formed a series of projections or ribs 15, equally spaced about the circumference of said clutch sleeve and extending substantially the full length of the same.

The clutch sleeve 14 is provided at its outer end with a fixed annular projection or flange, preferably having the form of a collar 16, which is rigidly attached to the outer end of said sleeve 14, conveniently by means of one or more set-screws 17. About the periphery of said collar 16 is an annular groove adapted to be engaged by any form of actuating device designed to transmit a sliding motion to the sleeve and collar upon the driven shaft 12 while permitting said sleeve and collar to rotate with the said shaft. Upon the inner face of the collar 16 and having fixed relation to the said collar and the sleeve 14, is a series of lugs 18. The end faces of said lugs are in general oblique to the longitudinal axis of the shaft: forming inclined surfaces giving to the lugs the properties of a cam.

20 indicates an intermediate clutch member or clutch ring, which constitutes the shifting member of the clutch, and which is capable of movement axially toward and from the driving clutch member 11. Said clutch ring 20 fits loosely upon the sleeve 14 and has a definite and limited rotative and longitudinal motion upon said sleeve. The inner surface of said ring 20 is provided with a series of grooves, of a width considerably greater than that of the ribs 15 of the sleeve 14, and forming between the grooves, a series of projections 21. These projections 21 of said ring extend into the longitudinal grooves on the surface of the sleeve 14, and likewise the projections or ribs 15 extend in the grooves on the inner surface of the ring 20. The extent of rotative motion of said ring upon the sleeve 14 is thereby limited to an angular distance represented by the difference between the circumferential thickness or width of the ribs 15 and the width of the grooves of said clutch ring 20.

22ª indicates a series of teeth upon the face of the ring 20 adjacent to the driving clutch member 11, and corresponding in form and arrangement with the teeth 22 of said driving clutch member, so that the two sets of teeth will mesh or interfit. The end faces of said teeth are shown as slightly inclined or beveled, in order to facilitate the initial engagement of the two sets of teeth, as will hereinafter more fully appear. Upon the opposite face of said clutch ring and adjacent to the clutch collar 16 is a series of pairs of notches 23 and 23ª, the notches constituting each pair being adjacent to each other. These notches are adapted to be engaged by the lugs 18 on the collar 16. One notch 23 of each pair of said notches has a cam surface 19ª which is inclined to correspond with the cam surface 19 of the lug 18 and which coacts with the same. The width circumferentially of the notch 23 is substantially equal to the extent to which the clutch ring is permitted to turn on the clutch sleeve, so that when said ring is so turned, the lug 18 will have angular movement from the notch 23 to the notch 23ª.

24 indicates a circular plate rigidly attached to the inner face of the sleeve 14 by a convenient number of screws 24ª. The diameter of said plate 24 is made greater than the diameter of the sleeve 14 in its part between the ribs 15, thus providing a series of stop shoulders adapted for contact with the adjacent end of the clutch ring, as a means of limiting the sliding movement of the clutch ring 20 on said sleeve toward the driving clutch member 11.

25 indicates an expansion spring, preferably of not more than two coils, surrounding the circular plate 24. One end of said spring is secured to said plate and the other end is secured to the clutch ring 20. Said spring is so arranged that its expansive tendency holds the ring 20 at one limit of its rotative movement upon the sleeve 14.

When the members of the clutch are in the position shown in Figs. 1 and 4, the driven shaft is entirely independent of the driving shaft, which may continue to rotate without turning the driven shaft. In this position also the lugs 18 are free from engagement with the notches 23 or 23ª of the ring 20.

In order that power may be transmitted from the driving shaft 10 to the driven shaft 12 there must be a positive interlocking of the teeth 22ª of the driven clutch member or ring 20 and the teeth 22 of the driving clutch member 11. To bring the said driven and driving clutch members into engagement with each other, power is applied to the clutch sleeve by any usual type of manually operated actuating device, acting in the collar 16, in a direction to effect endwise movement of the clutch sleeve 14, with the ring 20 mounted thereon, upon the driven shaft 12, in a direction toward the driving clutch member 11.

Assuming that the driving clutch member 11 is rotating in the direction indicated by the arrows in Fig. 1, it is evident that a sliding friction only will take place between the faces of the teeth 22 and 22ª, at the instant that said teeth come in contact with each other. By reason of said contact, the ring 20 will be retarded in its movement toward the driving member 11, but will retain its angular position relative to the sleeve 14, and collar 16, by reason of the action of the spring 25; thereby allowing the lugs 18, as the sleeve is advanced, to enter into the notches 23. At the instant the two cam surfaces 19 and 19ª come into contact with each other, the ring 20 will be forced forward and the tips of the teeth 22 and 22ª will come into actual engagement, but only to a slight extent. The beveled or inclined form given to both sets of clutch teeth will aid in insuring such slight engagement of the same, while the slightly rounded form given to the corners of the outer ends of the teeth will facilitate the entrance of the teeth of one clutch member into the notches or spaces of the other clutch member. The obvious and instantaneous effect of the partial engagement of the teeth effected, as described, will be the rotation of the ring 20 with the driving clutch member 11, through the short angular distance permitted by the spacing of the ribs 15 and the projections 21; the overcoming of the resisting tendency of the spring and the cam action of the two surfaces 19 and 19ª taking place by reason of the inertia of the driven shaft, the sleeve 14 and the collar 16. The teeth of the ring 20 are, by the action of the inclined or cam faces 19 and 19ª, as the clutch ring is so turned in the sleeve, forced into full engagement with the teeth of the driving member 11. As the clutch ring 20 is so turned on the sleeve 14, the lugs 18 will pass from the notches 23 and, as the clutch sleeve is pressed forward, will enter into the notches 23ª; the function of the latter being to provide a means of locking the ring 20 at the limit of its backward movement on the sleeve and to prevent any reverse movement or rotation such as would disturb the otherwise positive transmission of power from the driving shaft to the driven shaft, and insuring that the several clutch members will act as a unit in the transmission of power.

To throw out the clutch, power is applied to the collar 16 so as to effect a sliding movement of the clutch sleeve 14 upon the driven shaft 12 in a direction away from the driving clutch member 11. The clutch ring 20 at this time tends to remain in frictional engagement with the said driving clutch member and the lugs 18 are thereby entirely withdrawn from the notches 23ª. The plate 24 at this time engages the ring 20, carrying the same with the sleeve, which action disengages the teeth 22 and 22ª. After such disengagement of the said teeth takes place, the ring 20 actuated by the spring 25, is turned backwardly on the sleeve 14 to the limit of its movement in that direction; the notches 23 then being again brought opposite the lugs 18, this position being maintained by the action of the spring and the contact of the ribs 15 and the projections 21. The several driven clutch members have now assumed their original relative positions and the operation of throwing in the clutch may be repeated as before described.

A modification of the clutch is shown in Figs. 7 to 9 of the drawings, comprising members similar to those before described, with the exception of details hereinafter more fully set forth, and operating in like manner. In this instance, the clutch is adapted for operation during the rotation of the driving shaft in either direction. 25 indicates a driving clutch member provided with a plurality of teeth 25ª differing from the teeth of the clutch member 11, in Figs. 1 to 6 in that the number of the same is greater and the end faces of said teeth are not beveled. 26 indicates a collar similar to the collar 16 of Figs. 1 to 6, except that the lug 27 thereon is provided with two oppositely and equally inclined cam surfaces 28ª and 28ᵇ. 29 indicates a sleeve differing only from the sleeve 14 of Figs. 1 to 6 in that the ribs or projections 29ª are less in circumferential width than the projections 13 of Figs. 1 to 6, thus increasing the width of the grooves between them. 30 indicates a clutch ring having its outer face provided with a plurality of teeth 30ª, conforming with and adapted to engage the teeth 25ª of the clutch member 25. In the outer face of said clutch member 30 are located one or more sets of notches, each set consisting of three notches 31ª, 31ᵇ and 31ᶜ. One set only of such notches is shown in the drawings. The central notch 31ª is provided with two oppositely inclined faces adapted to conform with and to be engaged by the lug 27 and each adapted to perform the same function as the cam face 19ª of Figs. 1 to 6. The locking notches 31ᵇ and 31ᶜ, similar in form, are located one on each side of the notch 31ª, and each is adapted to receive the lug 27. The inner circumference of the said ring is provided with longitudinal grooves of a greater circumferential width than those of the ring 20 of Figs. 1 and 2, thus increasing the total extent of rotation of the ring relative to the sleeve, to an angular distance equal to that between the extreme notches 31ᵇ and 31ᶜ. 32 is a plate or disk similar in every respect to the plate 24 of Figs. 1 and 2. 33ª and 33ᵇ indicate two similar expansion springs, each spring being similar to the spring 25 of Figs. 1 to 6, but having one coil only. The function of each of said springs is the same as the spring 25 of Figs. 1 to 6, but said springs are coiled in opposite directions about the sleeve 29 so as to act oppositely upon the clutch ring. By this construction, as before stated, a rotative movement in either direction will be transmitted to the driven shaft, depending on the direction of rotation of the driving shaft. It follows that the operation of the clutch will be precisely as before described, except that it is double-acting or operates with the same effect when the driven member turns in either direction. It is, however, important to note that the total extent of rotation of the ring 30 relative to the sleeve 29 is practically twice that required in the case of a single-acting clutch, so that when the ring 30 is in either of its extreme positions determined by the contact of the projections 34ª and 34ᵇ, the lug 27 will be opposite either one of the notches 31ᵇ or 31ᶜ. It is the function of the two equally opposed springs to maintain the ring in its neutral or central position, and in such position that the lug 21 stands opposite the central notch 31ª, when the clutch is disengaged, and to also bring the ring back to its central or neutral position at the instant the lug has become disengaged from either of the locking notches 31ᵇ or 31ᶜ.

A clutch embodying the general features of construction, and having the principle of operation described, may be variously constructed with regard to its details, and I do not desire to be limited to the specific features of construction shown in the drawings, except so far as the same may be pointed out in the appended claims as constituting parts of my invention.

I claim as my invention—

1. A clutch comprising two concentrically mounted toothed clutch members, one of which is shiftable axially toward and from the other, and a rotative, axially movable, manually operable member having limited axial and rotative movement relatively to the shiftable clutch member; one of the two last-named parts, to wit, the manually operable member and the shiftable clutch member, being provided with a cam surface adapted to act on the other of said parts, when the shiftable clutch member is turned relatively to said manually operable member, to advance said shiftable clutch member into its clutching position.

2. A clutch comprising two concentrically mounted toothed clutch members, one of which is shiftable axially toward and from the other, a rotative, axially movable, manually operable member having limited axial and rotative movement relatively to the shiftable clutch member, one of the two last named parts, to wit, the manually operable member and the shiftable clutch member, being provided with a cam surface adapted to act on the other of said parts, when the shiftable clutch member is turned relatively to said manually operable member, to advance said shiftable clutch member into its clutching position, and a spring applied between said shiftable clutch member and manually operable member and tending to hold the said shiftable clutch member at one limit of its turning movement relatively to the manually operable member.

3. A clutch comprising two concentrically mounted toothed clutch members, one of which is adapted to be shifted axially toward and from the other, a shaft, a sleeve carrying the shifting clutch member, said sleeve having endwise sliding and non-rotative connection with said shaft; said shiftable clutch member consisting of a clutch ring mounted on said sleeve and having limited endwise sliding and rotative movement thereon, and said sleeve and clutch ring being provided, one with a cam surface and the other with a part engaging said cam surface; said cam surface acting to give endwise movement to the clutch ring into its clutching position when said ring is turned on the sleeve.

4. A clutch comprising two concentrically mounted toothed clutch members, one of which is adapted to be shifted axially toward and from the other, a shaft, a sleeve carrying the shifting clutch member, said sleeve having endwise sliding and non-rotative connection with said shaft; said shiftable clutch member consisting of a clutch ring mounted on said sleeve and having limited endwise sliding and rotative movement thereon, and said sleeve and clutch ring being provided, one with a cam surface and the other with a part engaging said cam surface, said cam surface acting to give endwise movement to the clutch ring into its clutching position when said ring is turned on the sleeve, and a spring applied between said sleeve and clutch ring and tending to hold said ring at one limit of its turning movement on the sleeve.

5. A clutch comprising two concentrically mounted toothed clutch members, one of which is shiftable axially toward and from the other, a shaft, a sleeve carrying the shiftable clutch member, and said sleeve having endwise sliding and non-rotative connection with said shaft; said shiftable clutch member consisting of a clutch ring mounted on said sleeve and having limited endwise sliding and rotative movement thereon, said ring being provided with a cam surface and locking notch adjacent to said cam surface and said sleeve being provided with a lug adapted to engage said cam surface and to enter said locking notch.

6. A clutch comprising two concentrically mounted toothed clutch members, one of which is shiftable axially toward and from the other, a shaft, a sleeve carrying the shiftable clutch member, said sleeve having endwise sliding and non-rotative connection with said shaft; said shiftable clutch member consisting of a clutch ring mounted on said sleeve and having limited endwise sliding and rotative movement thereon, said ring being provided with a cam surface and locking notch adjacent to said cam surface, and said sleeve having a lug adapted to engage said cam surface and to enter said locking notch, and a spring applied between said sleeve and clutch ring and tending to hold the clutch ring in position for the engagement of said lug with the said cam surface when the sleeve is moved endwise in a direction to carry said lug toward the clutch ring.

7. A clutch comprising two concentrically mounted toothed clutch members, one of which is adapted to be shifted axially toward and from the other, a shaft, a sleeve carrying the shifting clutch member, and said sleeve having endwise sliding and non-rotative connection with said shaft, and provided with a plurality of longitudinal ribs; said shiftable clutch member consisting of a clutch ring mounted on said sleeve and having a plurality of internal projections extending between the ribs in said sleeve, and narrower circumferentially than said spaces to afford limited rotative movement of the ring on the sleeve, and said sleeve and clutch ring being provided, one with a cam surface and the other with a part engaging said cam surface.

8. A clutch comprising two concentrically mounted toothed clutch members, one of which is shiftable axially toward and from the other, a shaft, a sleeve carrying the shiftable clutch member, said sleeve provided with a plurality of longitudinal ribs, said shiftable clutch member consisting of a clutch ring mounted on said sleeve and provided with a plurality of internal projections entering the spaces between said ribs and narrower circumferentially than said ribs, to permit limited turning movement of the ring on said sleeve; said ring being provided with a cam surface and locking notch adjacent to said cam surface, and said sleeve having a lug adapted to engage said cam surface and to enter said locking notch, and a spring applied between said sleeve and clutch ring and tending to hold the clutch ring in position for the engagement of said lug with the said cam surface when the sleeve is moved endwise in a direction to carry said lug toward the clutch ring.

9. A clutch comprising two concentrically mounted toothed clutch members, one of which is shiftable toward and from the other, a rotative, axially movable, manually operable member, having limited axial and rotative movement relatively to the shiftable clutch member, one of said parts, to wit, the manually operable member and the shiftable clutch member, being provided with two oppositely inclined cam surfaces adapted to act on the other of said parts, when the shiftable clutch member is turned relatively to the manually operable member, in either direction from a central or neutral position to advance the shiftable clutch member into its clutching position, and springs applied between said manually operable member and said shiftable clutch member and tending to hold said shifting clutch member in its said central or neutral position.

10. A clutch comprising two concentrically mounted toothed clutch members, one of which is adapted to be shifted axially toward and from the other, a shaft, a sleeve carrying the shiftable clutch member, said sleeve having endwise sliding and non-rotative connection with said shaft; said shiftable clutch member consisting of a clutch ring mounted on said sleeve and having limited endwise sliding and rotative movement thereon, and said sleeve and clutch ring being provided one with two oppositely inclined cam surfaces and the other with a part adapted to engage said cam surfaces, and oppositely acting springs applied between said sleeve and clutch ring, and tending to hold said clutch ring in a central or neutral position on the said sleeve.

11. A clutch comprising two concentrically mounted toothed clutch members, one of which is adapted to be shifted axially toward and from the other, a shaft, a sleeve carrying the shiftable clutch member, said sleeve having endwise sliding and non-rotative connection with said shaft, said shiftable clutch member consisting of a clutch ring mounted on said sleeve and having limited sliding and rotative motion therein, said ring being provided with two adjacent, oppositely inclined cam surfaces and with two locking notches, one at each side of the said cam surfaces, and the said sleeve being provided with a lug adapted to engage both of said cam surfaces and to enter either of said notches.

In testimony, that I claim the foregoing as my invention I affix my signature in the presence of two witnesses, this 24th day of April, A. D. 1912.

LEON J. CAMPBELL.

Witnesses:
GEORGE R. WILKINS,
EUGENE C. WANN.